United States Patent
Bonneau et al.

[11] Patent Number: 5,949,429
[45] Date of Patent: *Sep. 7, 1999

[54] METHOD FOR PERFORMING PIXEL ADDRESSING OPERATIONS FOR A TILED IMAGE

[75] Inventors: Paul Rolland Bonneau, North Bend; Arthur Francis Champernowne, Seattle; David T. Jones, Preston; Darrell A. Plank, Bellevue, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/747,785
[22] Filed: Nov. 14, 1996
[51] Int. Cl.⁶ ....................................................... G06F 15/00
[52] U.S. Cl. .............................................................. 345/433
[58] Field of Search ..................................... 345/433, 436, 345/438, 118, 121

[56] References Cited

U.S. PATENT DOCUMENTS 5,524,187  6/1996  Feiner et al. .............................. 345/419
5,561,747  10/1996  Crocker et al. .......................... 345/419

OTHER PUBLICATIONS

Gary Newman, "Organizing Arrays for Paged Memory Systems," *Communication of the ACM*, vol. 38. No. 7, Jul. 1995, pp. 93–103, and 108–110.

*Primary Examiner*—Phu K. Nguyen
*Attorney, Agent, or Firm*—Klarquist Sparkman Campbell Leigh & Whinston, LLP

[57]  ABSTRACT

A method for performing pixel addressing operations for a tiled image. The method maintains separate X and Y components of a pixel address in a tiled image. Each component includes a tile and pixel index spaced apart by blank bit fields such that when combined, the X and Y components form a pixel address that is directly dereferenced to read or write a pixel in the tiled image. To decrement or increment the X or Y component, the method introduces a mask such that any carry bit can be moved across the blank bit field between the tile and pixel indices. This enables the method to use the same efficient add/subtract and mask operations whether or not a pattern of pixel accesses crosses a tile boundary. The X and Y components are represented as virtual X and Y coordinates in a two-dimensional array of pixels to hide the details of the add/subtract and mask operations from the programmer.

16 Claims, 5 Drawing Sheets

METHOD FOR PERFORMING PIXEL ADDRESSING OPERATIONS FOR A TILED IMAGE

TECHNICAL FIELD

The invention relates to image processing in computers, and more specifically relates to addressing pixels in a tiled image.

BACKGROUND OF THE INVENTION

High resolution, full color digital images require more memory to represent them than is available in the main memory of a typical personal computer. This problem is compounded when more than one image is being accessed at the same time, such as, for example, when an imaging application is composing an image from more than one image. Most imaging applications, therefore, use some form of virtual memory to accommodate such images.

Virtual memory is a conventional memory management method that allows a computer system to present a larger memory region than is actually available in main memory. Operating systems typically implement virtual memory using a portion of secondary storage (e.g., memory on the hard drive) to augment physical memory and then mapping virtual memory addresses into physical memory addresses. Virtual memory is commonly managed in memory units called pages that are swapped in and out of physical memory as necessary to satisfy read and write requests. If an application program (application) attempts to access a piece of virtual memory which corresponds to data not currently in physical memory, the system issues a page fault. The operating system then instructs the hardware to swap in the page or pages from the hard drive needed to satisfy the request.

The system performance of imaging applications is typically very sensitive to the actual pattern of memory references. System performance is degraded when the system has to swap pages of memory to and from secondary storage frequently. If the pattern of memory references for image processing operations extend across page boundaries, the number of costly page swapping increases.

One way to represent an image is as a two dimensional array of pixels in computer memory. Using standard row-major representation, for an image of width W, the C-language expression for evaluating the address of the pixel at (x,y) is:

$$B+y*W+x,$$

where B is the base address of the image.

Many image processing algorithms refer to pixels clustered in both the x and y directions. As such, the standard row-major addressing scheme can lead to poor locality of reference since it is much more likely that successive rows (i.e. scan lines) are in different virtual memory pages. In order to perform operations on three pixels in a column, for example, the system must access three separate scanlines corresponding to three separate pages in virtual memory. The multiplication involved in the addressing expression can also add significant overhead.

Pixel clusters can be referenced in a straightforward fashion using conventional C index and pointer arithmetic notation. Two-dimensional array notation in C, however, can only be used for arrays with fixed dimensions, e.g. where W is a constant for all such arrays. Thus, two-dimensional array notation is generally impracticable for an application capable of dealing with a range of image sizes and aspect ratios.

The locality of reference problem can be mitigated by "tiling" the image. This maps the image as a sequence of smaller sub-images, or tiles, each of which represents a small rectangle of pixels (usually square, in practice). Tiles are usually arranged in rows across the image. The size of a tile is usually chosen to correspond to the size of a page in the virtual memory management system, but this is not a requirement for tiled image systems. Where the implementation of the computer's virtual memory permits, further efficiencies can be gained by making the tiles a power of two pixels wide, and aligning the "left hand" edge of the image by rounding the image's total width to a power of two. This allows a pixel address to be computed by regarding the linear offset of the pixel as a sequence of catenated bit fields as follows:

| Tile Y index | Tile X index | Pixel Y index within tile | Pixel X index within tile |
|---|---|---|---|

The exact distribution of the bits depends on the power of two used to limit the width of the image, the tile dimensions and the size of a pixel. A typical implementation might use a width of $2^{12}$, or 4096 pixels mapped into 64-pixel square tiles, with each pixel containing 4 bytes. This can be translated into a 32-bit address mapped as follows.

| Bits 31–20 | Bits 19–14 | Bits 13–8 | Bits 7–2 | Bits 1–0 |
|---|---|---|---|---|
| Tile Y index | Tile X index | Pixel Y index within tile | Pixel X index within tile | Offset within the pixel |

If the base address of the image in linear memory is zero, this is the actual pixel address in that the resultant value can be directly dereferenced to give the pixel values. The bit fields within the pixel address do not need to be re-arranged to access a pixel because an address in this format is the actual pixel address in memory. If the base address of the image is not zero, the sequence of bits including the X and Y tile indices and X and Y pixels within a tile only represent part of the actual pixel address, and the base address of the image has to be added to it to compute the actual pixel address in linear memory space.

When the width of the image and the dimensions of a tile are a power of 2, bit masking and shifting can be used to optimize pixel addressing operations such as incrementing or decrementing the pixel address. One example of this form of pixel addressing is described further in Newman, Gary, "Organizing Arrays for Paged Memory Systems" Communications of the ACM, July 1995, Vol. 38, No. 7 ("Newman").

While tiling improves system performance, it complicates the task of computing pixel addresses relative to a more intuitive format where pixels are stored in a two dimensional array. Most image processing applications are written for images in this two dimensional format, and therefore, potentially need to be modified when images are stored in a tiled format. One way to address this issue for tiled images is to write the application so that the code is explicitly aware of the tiled image format. In other words, pixel address computations have to be written specifically for a pixel address in the tiled image format, rather than a more intuitive two-dimensional array format. This approach leads to more efficient code but is costly to implement since tile aware code is complex and more difficult to write from scratch than writing code for an image represented as a standard two-dimensional array of pixels. Several pixel addressing operations (incrementing, decrementing or indexing) must be adapted to the tiled image format so that the application is compatible with tile images. Another possibility, as set forth in Newman's paper, is to create a series of macros for pixel address operations. A macro in this context refers to a shorthand notation for a piece of code that performs some function. Rather than write tile-aware code for each instance of the macro, he or she can simply insert the macro. In the context of image processing applications, an example of a macro would be a snippet of code that performs a pixel address operation (such as incrementing the X coordinate of a pixel in an image) on a pixel address or pointer to a pixel in a tiled image. This simplifies the programmer's task because he or she can substitute the macro for a pixel address operation rather than write an entire image processing routine so that it is expressly adapted for the tiled image format.

Though macros can simplify the task of creating an image processing routine, they can actually degrade performance of the application if not implemented properly. Typical image processing routines include loops in which the same machine instructions are performed over and over. Each time a routine needs to visit a new pixel, the routine needs to increment or decrement the pixel address. If this pixel addressing operation is implemented with the macro, the macro will be executed repeatedly. Thus, if the macro translates into inefficient machine code, it will degrade performance of the application.

SUMMARY OF THE INVENTION

The invention provides an improved method for performing pixel addressing operations for a tiled image. As introduced above, a pixel address in a tiled image includes X and Y tile indices, specifying the tile of a pixel, and X and Y pixel indices, specifying the pixel within the tile. The method of the invention separately maintains the X component (X tile and pixel indices) and the Y component (Y tile and pixel indices) of a pixel address and separately increments or decrements the X and Y components. To access a pixel, the X and Y components are combined, preferably using an indexed addressing operation. The method defers the combination of the X and Y components until a pixel located at the pixel address is accessed such as in a read or write operation.

The method implements pixel addressing operations efficiently whether or not a tile boundary is crossed. Rather than use a test operation to determine whether a pixel address operation will cross a tile boundary, the method uses mask operations that make pixel addressing operations independent of tile boundaries. The method performs increment and decrement operations, for example, by introducing a mask into the X component (or Y component) and then clearing the mask after adding or subtracting an offset value from the X component. The mask moves any carry bit between the tile and pixel index bit fields. Thus, if a pixel operation results in crossing a tile boundary, the mask will automatically cause the tile index to be updated properly.

In one implementation, the X and Y components are represented as C++ classes and pixel addressing operations (such as increment, decrement, index, etc.) are defined for each type to simulate operations on a two-dimensional array of pixels. These operations appear to the programmer as operations on a two-dimensional array of pixels, and they hide the steps of introducing and clearing the mask from the X and Y components.

Additional features and advantages of the invention will become more apparent from the following detailed description which proceeds with reference to the accompanying drawings.

DETAILED DESCRIPTION

Figure 1:
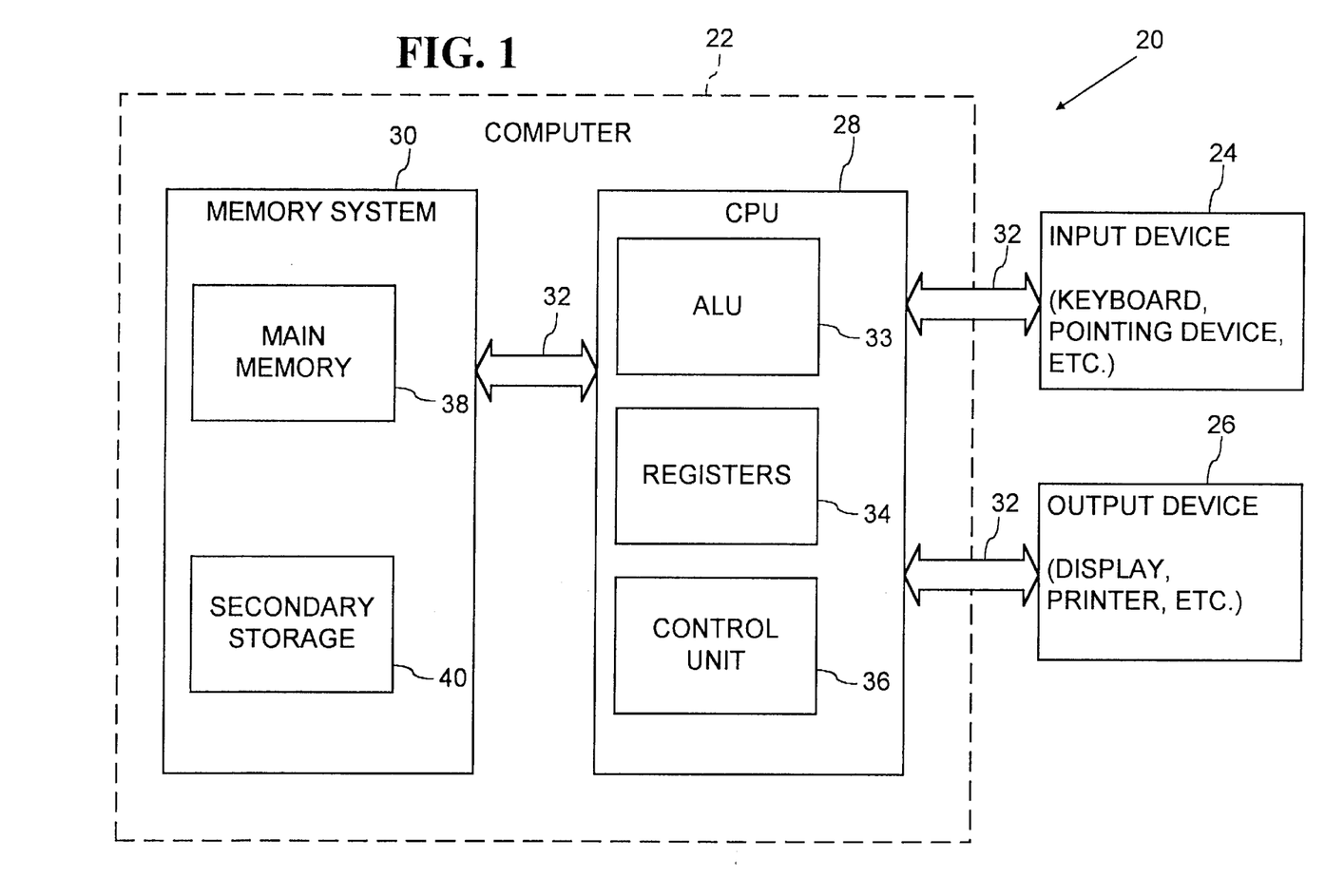
FIG. 1 is a general block diagram of a computer system in which the invention can be implemented.

FIG. 1 is a general block diagram of a computer system 20 in which the invention can be implemented. The computer system 20 includes as its basic elements a computer 22, one or more input devices 24 and one or more output device 26 including a display device.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system. The computer can be implemented using any of a variety of known architectures and processors including an x86 microprocessor from Intel and others, such as Cyrix, AMD, and Nexgen, and the PowerPC from IBM and Motorola. Preferably, the processor should support an indexed addressing mode in which the processor can compute an address from values in separate registers using a single instruction in the instruction set architecture.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently running application programs. The operating system is the set of software which controls the computer system's operation and the allocation of resources. The application programs are the set of software that performs a task desired by the user, making use of computer resources made available through the operating system. In addition to storing executable software and data, portions of main memory 38 may also be used as a frame buffer for storing digital image data displayed on a display device connected to the computer 22.

The operating system commonly provides a number of functions such as process/thread synchronization, memory management, file management through a file system, etc. The operating system also provides virtual memory management. The Windows 95 operating system from Microsoft Corp., for example, provides paged memory management in which it carries out memory allocation, de-allocation, and swapping operations in memory units called "pages." On the 386 computer architecture developed at Intel and used widely throughout the computer industry, a memory page in virtual memory is 4 KB piece of memory. The virtual memory manager in the Windows 95 operating system manages virtual memory by swapping data and executable code between main memory and secondary storage. As alluded to in the background section, virtual memory management relates to image tiling because image tiles are typically the size of a page in virtual memory. For the purposes of this invention, the precise method used for virtual memory management is not critical. In fact, the method for accessing pixels in a tiled image described and claimed below are relatively independent of the specific implementation of virtual memory. In the context of the invention, it does not matter whether there is only one page per tile or several pages per tile.

Below we describe software implementations of the invention in some detail. This software can be implemented in a variety of programming languages, which when compiled, comprises a series of machine-executable instructions stored on a storage medium readable by a computer ("computer-readable medium"). The computer-readable medium can be any of the conventional memory devices described above in connection with main memory and secondary storage.

Input device 24 and output device 26 are typically peripheral devices connected by bus structure 32 to computer 22. Input device 24 may be a keyboard, pointing device, pen, joystick, head tracking device or other device for providing input data to the computer.

The output device 26 represents a display device for displaying images on a display screen as well as a display controller for controlling the display device. In addition to the display device, the output device may also include a printer, sound device or other device for providing output data from the computer.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the computer industry.

Figure 2:
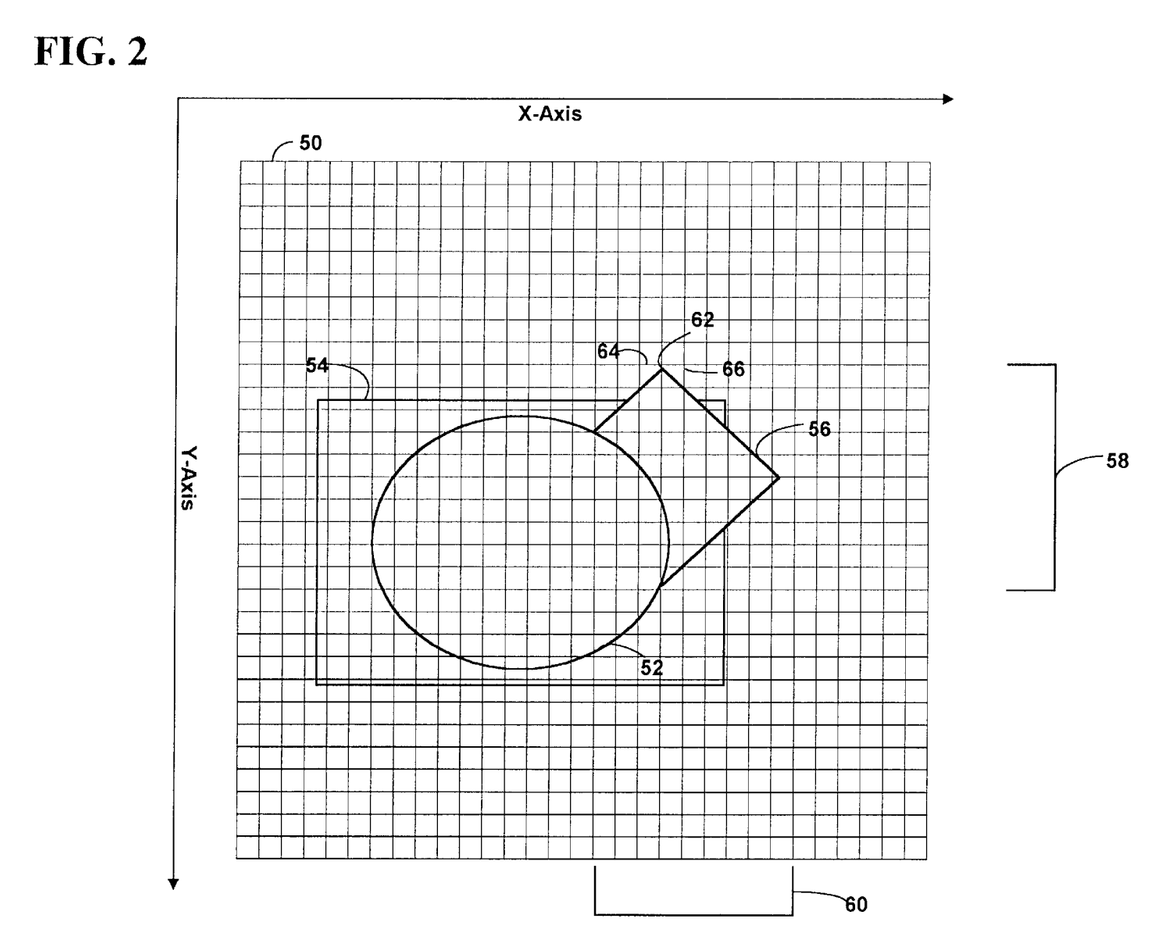
FIG. 2 is a diagram illustrating a simple example of a tiled image.

The invention provides an improved method for performing pixel addressing operations in a tiled image. Before describing this method in detail, we begin with a brief illustration of a tiled image. FIG. 2 illustrates an example of a tiled image. The image is divided into a rectangular array of tiles (see tile 50 for example). For the purposes of this application, we refer to the two dimensions of this rectangular array as X and Y. The row number of a tile is the Y tile index and the column number of the tile is the X tile index. In this particular example, the image consists of 31 rows and columns of tiles.

The image includes three geometric shapes, an ellipse 52, a rectangle 54, and a diamond 56. In order to perform operations on the diamond, for example, the system only has to deal with a limited number of tiles in the image. These tiles fall in rows marked with the bracket 58 and in columns marked with bracket 60. Tiled images improve system performance because they reduce the number of times the virtual memory manager has to swap tiles in and out of secondary storage.

While efficient use of virtual memory is significant, it is also important to use processor resources efficiently when performing pixel addressing computations for tiled images. Pixel addressing operations often cross tile boundaries. Dealing with the cases where an addressing operation crosses a tile boundary can translate into inefficient code if not implemented properly. FIG. 2 illustrates an example of a situation where an image processing operation will include pixel addressing operations that traverse a tile boundary. Image processing at the top point 62 of the diamond shape will likely involve pixel accesses to pixels in two adjacent tiles shown as items 64 and 66 in the diagram. Some pixel addressing methods treat crossing a pixel boundary as a special case and test each pixel increment or decrement operation to determine whether this special case is satisfied. This is inefficient because the test operation has to be performed for every pixel regardless of whether it is at a tile boundary. The code that implements the pixel addressing operation must be efficient, or else it will degrade performance of the application. To clarify this point, it is helpful to look at a more detailed diagram of a tiled image.

Figure 3:
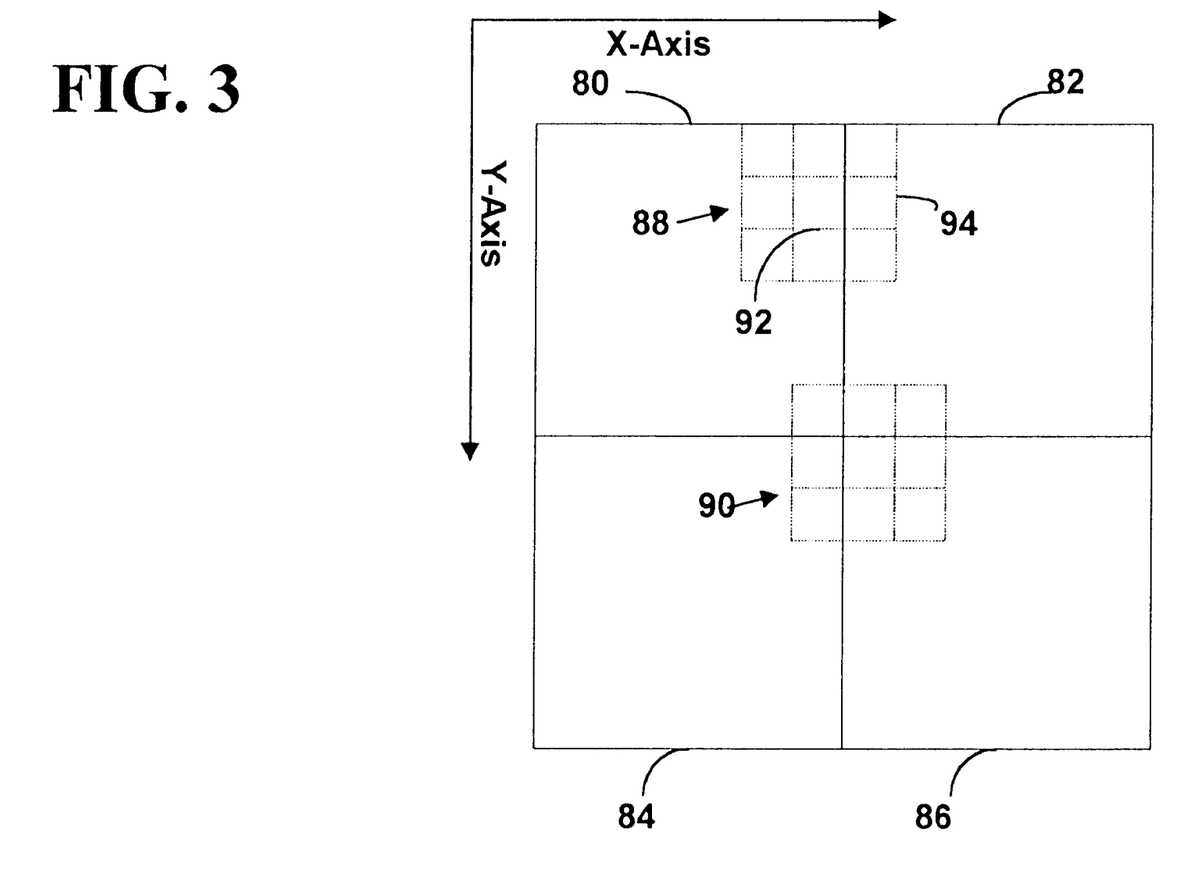
FIG. 3 is a diagram illustrating a portion of a tiled image format in more detail.

FIG. 3 is a diagram illustrating an expanded view of 4 tiles in the image. Each tile (80–86 in FIG. 3) is an m x n rectangle of pixels where m and n are integers. This particular example shows two blocks of 3×3 pixels overlapping the tiles (see 88 and 90). We refer to the location of a pixel in a tile using an X and Y pixel index. The Y pixel index is the row number of a pixel within a tile, and the X pixel index is the column number of the pixel within a tile. A typical image processing application performs operations on neighborhoods of pixels around a reference pixel. For example, pixel operation may include sampling or filtering pixel values in a 3×3 pixel neighborhood around a reference pixel. To access each pixel in this neighborhood, the image processing routine sometimes has to traverse tile boundaries as shown in FIG. 3.

Assume that the pixel at the top of the diamond 62 in FIG. 2 corresponds to the pixel 92 at the center of the 3×3 pixel cluster 88 shown in FIG. 3. A typical filtering operation includes filtering pixel values of neighboring pixels in the cluster. During this filtering application, the boundary between tiles 80 and 82 will be traversed as the application computes a new pixel address for pixels in the cluster. It is important that the pixel address operations used to compute new pixel addresses be efficient as possible to optimize the performance of the application. This is especially true for image processing applications where pixels are addressed millions of times.

As noted in the background section, the size of the tile and width of the image should be chosen so that the linear address of a pixel can be written as a sequence of bit fields specifying the tile and offsets to a pixel within the tile. The dimensions (m and n) of the tile should be a power of 2. In addition, the width of the image, sometimes referred to as the stride, should be a power of two. As set forth in Newnam, this can be achieved by allocating extra virtual memory. When these two requirements are met, a pixel address in linear address space can be written as a sequence of catenated bit fields including: a tile Y index, a tile X index, a pixel Y index within the tile, and a pixel X index within the tile. If the base address of the image is not at 0, the base address has to be added to this sequence of catenated bit fields to compute the pixel address. This sequence of bit fields is a linear offset to the pixel and can be directly dereferenced to access the pixel. If the size of a pixel is larger than a single byte, the sequence of bit fields can also include an offset within the pixel. For example, if each pixel comprises a byte each of Red, Green and Blue colors (or YUV) and alpha (translucency or "grey scale" information), each component within the pixel can be accessed using an offset within the pixel.

A simple example of an address in this form is:

$y_1y_2x_1x_2y_3y_4x_3x_4+k$, where k is a reference or base address, $y_1y_2$ represents a y tile index (or tile row number), $x_1x_2$ represents an x tile index (or tile column number), $y_3y_4$ represents an offset to the row of pixels containing a pixel in the tile, and $x_3x_4$ represents an offset to the column of pixels containing the pixel in the tile.

The pixel address can be represented by a pointer to the pixel, and this pointer can be directly dereferenced to access the pixel for a read or write operation.

This example address format for a tiled image corresponds to a pixel address in Cartesian coordinates of $x_1x_2x_3x_4$, $y_1y_2y_3y_4$. Cartesian coordinates refer generally to a two dimensional array of pixels where $x_1x_2x_3x_4$ and $y_1y_2y_3y_4$ represent the coordinates of a pixel in each dimension (e.g. horizontal and vertical).

Since the pointer is comprised of interleaved X and Y components, one way to increment or decrement a pixel in the X direction includes the following steps: 1) separating the X component from the Y component; 2) separately incrementing or decrementing the X component; and 3) combining the new X component with the Y component to place the pointer into a format that the computer system can directly dereference to access the pixel. The Y component can be incremented and decremented in a similar fashion.

The step of separating the X and Y components can be eliminated entirely if the X and Y components are maintained separately, i.e. are stored in separate memory locations. The components only need to be combined when a pixel is accessed such as in a read or write operation. To illustrate this point, consider the following the sequence of steps needed to compute a pixel at (X+1, Y+1):

1) Separate X and Y components;

2) Increment the X component;

3) Recombine;

4) Separate the X and Y component;

5) Increment the Y component;

6) Recombine the X and Y components; and

7) Access the pixel referenced by the combined X and Y components.

The above method is not preferred because it includes unnecessary steps 3) and 4) where the address is recombined and then separated again before the pixel it refers to is accessed. These two steps are unnecessary. Further steps of separating and recombining the address can be eliminated by maintaining the X and Y components separately and then deferring the combination of these components until the pixel is accessed.

The preferred method of implementing pixel addressing in a tiled image, therefore, includes the following steps:

1) maintain the X and Y components separately;

2) separately increment or decrement the X and Y components; and 3) defer combination of the X and Y components until the point of accessing a pixel.

The first step means that the X and Y components of the address are stored separately. The general form of the address is as follows:

| The Y component | | | |
|---|---|---|---|
| tile Y index | blank | pixel y index | blank |

| The X component | | | |
|---|---|---|---|
| blank | tile X index | blank | pixel X index |

In this implementation, the base address of the image in linear memory is pre-added to the X and Y components. To pre-add the base address into the X component for example, this implementation takes the X and Y components (X and Y tile and pixel indices assuming a base address of zero), combines them (X bitwise OR Y), adds the base address K, and then applies an X component mask to remove the Y component. The process is the same for the Y component, except that a Y component mask is used to remove the X component.

The X component mask removes the Y component by setting the bitfields for the Y tile and Y pixel to zero in this implementation. The same applies to the process of pre-adding the base address K to the Y component.

The base address K is decomposed into X and Y base Cartesian coordinates $K_1$ and $K_2$, and these base coordinates are maintained separately to facilitate conversion of the X and Y components (with the base address folded into them) to Cartesian coordinates. To compute these base Cartesian coordinates, this implementation takes the base address K and clears the bits in the bit fields of the X tile and pixel indices, in the case of the Y base Cartesian coordinate. Similarly for the X base Cartesian coordinate, the implementation takes the base address K and clears the bits in the bit fields of the Y tile and pixel indices.

As shown above, the bit fields for the tile and pixel indices are separated by "blank" bit fields. The blank sections between the tile and pixel indices can be defined to be all zeros or all ones depending on how the X and Y components are incremented and decremented and how these components are combined to form the address of a pixel in virtual memory. Each of the bit fields are spaced so that the bit fields in the X and Y components are in the proper bit position when the two components are combined to form an address.

A simple example of an address in this format is:

The Y component: $y_1y_200y_3y_400$, $k_1$

The X component: $00x_1x_200x_3x_4$, $k_2$ where the bit fields $x_1x_2$, $x_3x_4$, $y_1y_2$, $y_3y_4$ and have the same meaning as in the example ($y_1y_2x_1x_2y_3y_4x_3x_4$) above, and ($k_1,k_2$) are the base X and Y components.

If the base address K is pre-added into the X and Y components, the bitfields actually include a combination of the base address as well as the X and Y tile and pixel indices. In this example, the blanks between the bit fields in each component are set to zero. The parameters $k_1$ and $k_2$ are the Cartesian base coordinates of the X and Y components, respectively. As noted above, in this implementation the base address K forms part of the X and Y components. The base Cartesian coordinates ($K_1$ and $K_2$) are not part of incrementing, decrementing, or dereferencing operations, but they are used to convert the X and Y components to corresponding Cartesian coordinates. Specifically, $K_1$ is subtracted from the X component to get the x portion of the Cartesian coordinate, and $k_2$ is subtracted from the Y component to get the y portion of the Cartesian coordinate. Once the Cartesian base coordinate is removed from the component, the bitfields represent the X and Y tile and pixel indices. The bitfields need to be shifted to get the actual Cartesian coordinates ($x_1x_2x_3x_4$, $y_1y_2y_3y_4$).

Given the format illustrated above, the individual X and Y components can be incremented and decremented using solely arithmetic operations while avoiding costly branch operations. The general approach is to introduce a mask to move any carry bit across the blank bit fields. There are a variety of ways to introduce a mask to move the carry bit across the blank bit field between tile and pixel indices. The term "introducing a mask" generally refers to the step of defining or setting a value of the blank bit field so that the carry bit is moved across the blank bit field. In some cases, this requires no additional operation during a pixel addressing operation because the blank bit field values are pre-defined such that the mask is already present in the X or Y component for an pixel address computation. In other cases, the value of the blank bit field needs to be adjusted so that any carry bit will be moved across the blank bit field. In these cases, the blank bit field can be set to the value of the mask. One way to set the mask is to simply add the mask to the blank bit field. This is the preferred way to introduce the mask for increment operations where the blank bit field values are predefined to be zero because the mask and the value of the offset can be combined together and added to the X or Y component in a single operation.

Below, we describe the value of the mask used for increment and decrement operations. It is important to emphasize that the mask may be introduced into the X and Y components in a variety of ways. For example, it may be added along with an offset value, or it may be predefined as a default value. For an increment operation, the blank bit field between the pixel index and tile index is set to all ones, while for a decrement operation, this blank bit field is set to all zeros. If the default values for a blank bit field are all ones, then there is no need to set the bits for an increment operation, but these bits should be set to zero for a decrement operation.

Conversely, if the default values for a blank bit field are all zeros, then there is no need to set the blank bit field to all zeros for a decrement operation, but these bits should be set to all ones for an increment operation. For example if the current pixel is at the end of a row in a tile (such as pixel 92 in FIG. 3) and the pixel pointer is incremented by 1 pixel, the resulting pointer will point to the left most pixel (pixel 94, FIG. 3) in the tile immediately to the right of the current tile. There is a carry across the blank bit field between the pixel X index and the tile X index. The carry bit increments the tile X index such that the pointer refers to the adjacent tile in the next column.

Figure 4:
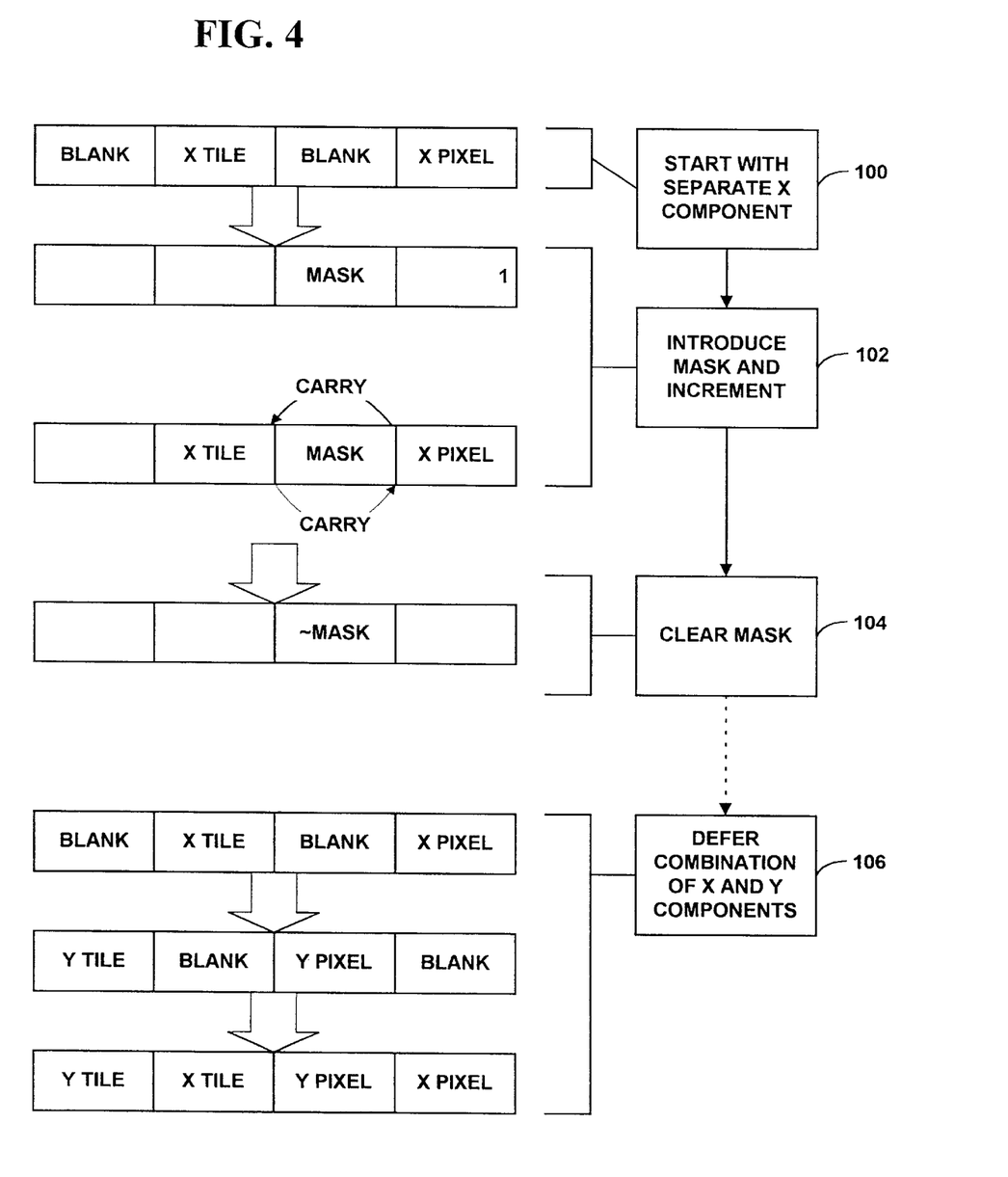
FIG. 4 is a diagram illustrating a method for incrementing or decrementing the X component of a pixel pointer for a tiled image.
Figure 5:
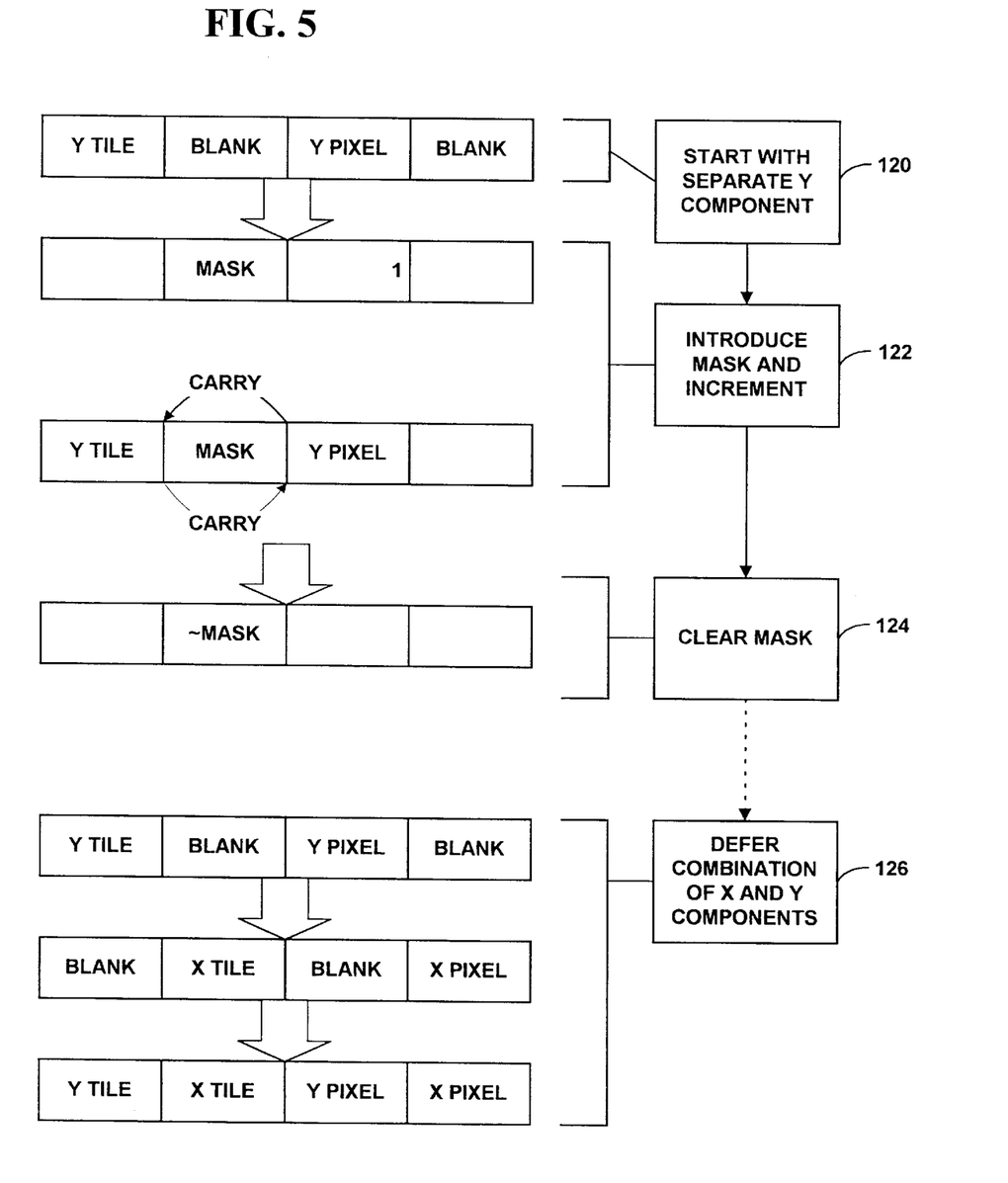
FIG. 5 is a diagram illustrating a method for incrementing or decrementing the Y component of a pixel pointer for a tiled image.

FIGS. 4 and 5 are diagrams illustrating how an implementation of this method is used to perform pixel addressing operations on the X and Y components. FIG. 4 illustrates an operation on the X component while FIG. 5 illustrates an operation on the Y component of a pixel address for a tiled image. As shown in both FIGS. 4 and 5, the X and Y components are maintained separately and any pixel addressing operation, therefore, begins with a separate X or Y component (See steps 100, FIG. 4 and 120, FIG. 5).

It should be noted that if the blank bit fields default to zero, no mask is introduced during a decrement operation. No affirmative step of introducing a mask occurs in this case because the blank bitfields are defined to be zero. In effect, the mask is "introduced" when the blank bit field between the tile and pixel indices is defined to be zero.

In an increment operation, the method adds the value of the mask plus one in a single step as shown in FIGS. 4 and 5. This has the effect of introducing the mask between the tile and pixel indices and incrementing the X or Y component in a single operation (See steps 102, FIG. 4 and 120 FIG. 5). The value added to the X or Y component would change if, for example, the pixel were larger than a byte or if an offset larger than 1 pixel is added to the component. If there is any carry bit between the tile and pixel indices, the mask moves the carry across the bit field as shown in FIGS. 4 and 5.

In the case where the default value of the blank bit field is zero, an example of the code for incrementing and decrementing the X component of the pixel pointer is as follows.

Increment the X component by 1 pixel:
Xcomponent=(Xcomponent+mask+1) &~mask;
Decrement the X component by 1 pixel:
Xcomponent=(Xcomponent−1) &~mask In the first part of the expression for the increment operation, the sample code introduces a mask to fill in the blank field between the tile X and pixel X bit fields to all ones. The sample code also adds the size of 1 pixel (in this case it is 1). Most compilers combine the constant values for the mask and size of the pixel during compile time, and therefore, this operation adds no additional overhead at run time. Next, the sample code (&~Mask- AND NOT Mask) removes the mask from the X component of the address. This step is illustrated as step 104 in FIG. 4 and step 124 in FIG. 5. When the mask is cleared, the X component (FIG. 4) or the Y component (FIG. 5) are returned to their original form with a blank bit field between the tile and pixel indices.

Note that the X component can remain in the same register in the CPU and be processed in two successive monadic operations as follows:

1) increment X component by combined pixel increment and mask; and
2) clear the mask from X component.

In the first part of the decrement operation (Xcomponent−1), the bit field does not have to be set to zero because the proper mask value already exists at the blank bit field between the tile x and pixel x index. In this case, the sample code simply decrements the current X component by one size of a pixel (1 in this example). Next, the sample code (&-mask removes, or clears the mask in the bit field between the tile X and pixel X bit fields. Like the increment operation, this can be implemented in two monadic operations as follows:

1) decrement the X component by the size of one pixel (the mask is all zeros); and
2) clear the mask from the X component.

A pixel can be incremented, decremented or indexed in the X or Y direction using this general approach. The term "indexing" in this context generally refers to locating a new pixel by adding/subtracting a value to/from a base value (i.e. the current X or Y components of a reference pixel). In general, indexing is another form of incrementing or decrementing the X or Y components, although incrementing and decrementing a pixel is typically used to refer to moving one pixel up/down or left/write in the image. If the value to be added to the X or Y address component is a constant in an index operation, it can be folded into the step of introducing the mask into the X or Y component. The sample code would be:

Xcomponent+(mask+constant).

If the value added in the index operation is a variable, it cannot be combined with the mask at compile time, but the format of the operation is similar:

Xcomponent+mask;

Xcomponent+Xoffset; where Xoffset is a variable offset.

Unless stated otherwise, the terms incrementing and decrementing encompass indexing operations in this description as well as in the claims of the invention.

The pointer format described above is advantageous because it enables incrementing and decrementing operations to be performed efficiently with only add/subtract, and mask operations. No test or branch instructions are needed because the pixel addressing method described above, and specifically the use of the masks, automatically deals with the cases where a pixel address operation requires a transition from one tile to another.

The method avoids a test operation by using a mask to move the carry from one portion of the bit field to another. The mask is essentially a constant which is introduced into the x or y component to move any carry bit from one bit field to another. The constant is then removed or cleared to mask it from the x or y component.

Pixel operations at the boundary of the tiles, such as at the end of a row or at the bottom of a column, are inefficient when implemented using a test operation to determine whether the current pixel is at the boundary of a tile. An example of this technique is set forth in the Newman paper cited above in the background section. These test operations, when compiled into machine level code, require branch operations. These branch operations, especially if executed several times in the inner loop of a pixel processing operation, severely degrade performance of the image processing operation. This is primarily true on the Intel chipset and most machines which have a pipelined architecture since these processors optimize throughput by "prereading" the next set of instructions and any branch instructions preclude this optimization.

An example of the code for incrementing a pixel address one pixel in the Y direction (X, Y+1) following Newman's approach follows below. In this example, the image is a 256 level monochrome image with 64 pixel wide tiles and a maximum width of 4096 pixels.

```
// x,y+1
if (((PXLPTR)pxlPointer & 0xfc0) == 0xfc0)
    pxlPointer += 0x40000 - 0xfc0;
else
    pxlPointer += 0x40;
sidesum += *pxlPointer;
// Generated assembly language for the above:
// edx has pxlPointer in it...
// =======
//          mov ebx, edx
//          and ebx, 00000fc0h
//          cmp ebx, 00000fc0h
//          jne SimpleInc
//          add edx, 0003f040h
//          jmp Skip
// SimpleInc:
//          add edx, 64
// Skip:
//          xor ebx, ebx
//          mov bl, BYTE PTR[edx]
//          add eax, ebx
```

Note that the source code version of Newman's method requires the use of a test operation and does not use a mask as in the method described here. The corresponding assembly language for this example is written for an Intel x86 compatible machine, and the notation "eax, ebx and edx" all refer to standard registers in the x86 processor.

A corresponding implementation of this same operation, using the improved method of the invention follows below.

```
// x,y+1
vyc += 0x3f040;
vyc &= ~0x3f000;
sidesum += (*(PXL *)(vxc + vyc));
// Generated assembly language for the above:
// esi has vxc in it, edi has vyc in it...
// =======
//          add edi, 0003f040h
//          and edi, fffc0fffh
//          xor ebx, ebx
//          mov bl, [esi + edi]
//          add eax, ebx
```

Note that in this method, there are no branch instructions whether or not the pixel is at a tile boundary. Also note that the step of combining the X and Y components is most efficient in processors that support indexed addressing by two registers simultaneously as illustrated here in the instruction "mov b1, [esi+edi]."

As noted above, the step of combining the X and Y components of the pixel pointer or address can be and preferably is deferred until the computer actually has to access a pixel, such as in a read or write operation. Since the X and Y components are maintained separately, the computer can combine them to form a complete pixel address only when necessary to access a pixel. Deferring the operation used to combine the X and Y components is advantageous because it avoids unnecessary steps of combining and separating the X and Y components before a pixel needs to be accessed. In processors that support indexed addressing mode, the step of combining the X and Y components can be performed in a single operation. Step 106 in FIG. 4 and step 126 in FIG. 5 illustrate how the method adds the X and Y components to form a complete pixel address. The bit fields of the tile and pixel indices are aligned so that when combined the X and Y components form a pixel address that can be directly dereferenced to access a pixel.

Above, in the description of a general computer system in FIG. 1, we noted that the processor should preferably support indexed addressing. As the assembly language example illustrates, x86 compatible processors from Intel Corp. and others support indexed addressing from two registers simultaneously. The pixel indexing operation described above is still an improvement, even in processors that do not support indexed addressing because it requires no branch instructions.

We have described a pixel addressing method that improves the efficiency of pixel addressing operations in a processor. Another benefit, in addition to the added efficiency, is the way this method can simplify the programmers task. The method can be implemented as a macro in a high level source code language such as C. Yet another way to implement the methods for performing pixel addressing operations described above is to implement pixel addressing operations using a class library in the C++ programming language. This enables the pixel addressing operations to appear to the programmer as a set of simplified addressing operations for addressing pixels in a two-dimensional array.

In one specific implementation, a class library written in the C++ programming language provides an easy to use format for addressing pixel in the tiled format. In this implementation, the X and Y components are implemented as distinct data types such that incrementing, decrementing and indexing operations can be performed on X and Y components as if they represented the coordinates of a pixel in a two dimensional array of pixels. This approach includes three separate C++ classes: 1) a virtual X coordinate; 2) a virtual Y coordinate; and 3) a virtual pixel.

The virtual X and Y coordinates represent the X and Y components in the tiled address format described above. The virtual X and Y classes implement the pixel addressing operations described above and hide them from the programmer by overloading arithmetic operators to support a variety of pixel addressing operations including incrementing, decrementing, indexing and others. The overloaded operators on virtual x and y coordinates simulate pixel addressing operations for a two-dimensional array of pixels. For example, the expression to increment a virtual X coordinate is:

vxc++;
where vxc is the virtual x coordinate and ++ is an overloaded operator of the virtual X coordinate class which implements:

Xcomponent=(Xcomponent+Mask+1)&~Mask.

The virtual pixel represents the address of a pixel in a tiled image. The pixel pointer is the combined X and Y components of the pixel address.

The use of C++ class libraries is only one specific way to implement the method for performing pixel addressing operations described above. This approach simplifies the programmers task but is not necessary to implement the invention. The invention may be implemented in a variety of different programming languages and can implemented using macros. In view of the many possible implementations to which the principles of our invention may be applied, we emphasize that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. A method for performing pixel addressing operations for a tiled image stored in memory of a computer, the method comprising:

separately maintaining X and Y components of a pixel address for a tiled image, where the X component comprises a sequence of bit fields including an X tile index, an X pixel index, and a blank bit field between the X tile and X pixel indices, and the Y component comprises a sequence of bit fields including a Y tile index, a Y pixel index, and a blank bit field between the Y tile and Y pixel indices, where the blank bit field in both the x and y components comprises a predetermined number of bit positions separating the tile and pixel indexes;

incrementing or decrementing the X or Y components independently, including introducing a mask to either the X or Y components, adding a value to or subtracting the value from the X or Y component using the mask to move any carry bit across the blank bit field between the X tile index and X pixel index for the X component, or across the blank bit field between the Y tile index and the Y pixel index for the Y component, and clearing the mask after the add or subtract operation; and combining the X and Y components to produce a pixel address that is dereferenced to access a pixel in memory at the pixel address.

2. The method of claim 1 wherein the step of combining the X and Y components is deferred until a pixel located at the pixel address is accessed.

3. The method of claim 1 wherein the bit fields in the X component are arranged in the following sequence from least significant bit to most significant bit:

the X pixel index, the blank bit field between the X pixel index and the X tile index, the X tile index, and another blank bit field;

and wherein the bit fields in the Y component are arranged in the following sequence from the least significant bit to the most significant bit:

another blank bit field, the Y pixel index, the blank bit field between the Y pixel index and the Y tile index, and the Y tile index.

4. The method of claim 1 wherein the bit fields in the X component are arranged in the following sequence from least significant bit to most significant bit:

a pixel offset, the X pixel index, the blank bit field between the X pixel index and the X tile index, the X tile index, and another blank bit field;

and wherein the bit fields in the Y component are arranged in the following sequence from the least significant bit to the most significant bit:

a blank bit field, the Y pixel index, the blank bit field between the Y pixel index and the Y tile index, and the Y tile index.

5. The method of claim 1 wherein a non-zero base address of the image forms part of the X and Y components such that when the X and Y components are combined into the pixel address, the non-zero base address is already part of the pixel address.

6. The method of claim 1 wherein the combining step comprises combining the X and Y components stored in separate registers with an indexed addressing operation.

7. The method of claim 1 wherein the X component is represented as a first data type that simulates an X coordinate of a pixel in a two-dimensional array of pixels, and the Y component is represented as a second data type that simulates a Y coordinate in the two-dimensional array of pixels;

and wherein the incrementing and decrementing operations are represented with overloaded operators that implement the steps of: introducing the mask, adding or subtracting the value, and then clearing the mask.

8. The method of claim 1 wherein the step of introducing the mask includes adding the mask to the blank bit field between the X tile and the X pixel index such that each bit in the blank bit field is set to one; and wherein the step of clearing the mask includes setting each bit in the blank bit field to zero.

9. The method of claim 1 wherein the step of combining the X and Y components comprises adding the X component stored in a first register with the Y component stored in a second register.

10. A method for performing pixel addressing operations for a tiled image stored in memory of a computer, the method comprising:

separately maintaining X and Y components of a pixel address for a tiled image, where the X component comprises a sequence of bit fields including an X tile index, and an X pixel index, and the Y component comprises a sequence of bit fields including a Y tile index, and a Y pixel index, where the tile and pixel indexes in both the x and y components are separated by a predetermined number of bit positions;

separately incrementing or decrementing one of the X or Y components by putting a mask in the bit positions separating the tile and pixel indexes in the component and incrementing or decrementing the component without testing whether the pixel address currently points to a pixel at a boundary between tiles; and combining the X and Y components to produce a pixel address that is directly dereferenced to access a pixel in memory at the pixel address.

11. The method of claim 10 wherein the step of combining the X and Y components is deferred until the pixel at the pixel address is accessed in a read or write operation.

12. The method of claim 11 wherein the step of combining the X and Y components includes adding the X and Y components together.

13. The method of claim 12 wherein the step of combining the X and Y components includes performing an indexed addressing operation in which the X and Y components are added to form a new pixel address and the pixel at the new pixel address is accessed using a singled indexed address operation.

14. The method of claim 10 wherein the step of separately maintaining the X and Y components comprises storing the X component in a first register, and storing the Y component in a second register, different from the first register.

15. The method of claim 10 wherein the X component is represented as a first data type that simulates an X coordinate of a pixel in a two-dimensional array of pixels, and the Y component is represented as a second data type that simulates a Y coordinate in the two-dimensional array of pixels;

and wherein the incrementing and decrementing operations are represented with software functions that implement the steps of putting the mask in the X or Y component and incrementing the X or Y component.

16. A computer readable medium on which is stored software for performing pixel addressing operations for a tiled image, the software, when executed by a computer, perform the steps of:

separately maintaining X and Y components of a pixel address for a tiled image, where the X component comprises a sequence of bit fields including an X tile index, an X pixel index, and a blank bit field between the X tile and X pixel indices, and the Y component comprises a sequence of bit fields including a Y tile index, a Y pixel index, and a blank bit field between the Y tile and Y pixel indices, where the blank bit field in both the x and y components comprises a predetermined number of bit positions separating the tile and pixel indexes;

incrementing or decrementing the X or Y components independently, including introducing a mask to either the X or Y components, adding a value to or subtracting the value from the X or Y component using the mask to move any carry bit across the blank bit field between the X tile index and X pixel index for the X component, or across the blank bit field between the Y tile index and the Y pixel index for the Y component, and clearing the mask after the add or subtract operation; and combining the X and Y components to produce a pixel address that is dereferenced to access a pixel in memory at the pixel address.

* * * * *

UNITED STATES PATENT AND TRADEMARK OFFICE
CERTIFICATE OF CORRECTION

PATENT NO. : 5,949,429

DATED : September 7, 1999

INVENTOR(S) : Bonneau et al.

It is certified that error appears in the above-identified patent and that said Letters Patent is hereby corrected as shown below:

Column 6, line 55, "As set forth in Newnam," should read --As set forth in Newman,--.

Column 10, line 59, "one pixel up/down or left/write" should read --one pixel up/down or left/right--.

Column 12, line 19, "mov b1, [esi+edi]" should read --mov bl, [esi+edi]--.

Column 13, line 25, "and can implemented" should read --and can be implemented--.

In the Claims:

Column 13, line 48, "pixel indexes;" should read --pixel indices;--.

Column 13, line 58, "indexes" should read --indices--.

Column 13, line 62, "pixel indexes" should read --pixel indices--.

Column 15, line 11, "using a singled indexed address" should read --using a single indexed address--.

Column 16, line 13, "pixel indexes;" should read --pixel indices;--.

Signed and Sealed this

Twenty-fourth Day of April, 2001

*Attest:*

NICHOLAS P. GODICI

*Attesting Officer*   *Acting Director of the United States Patent and Trademark Office*